United States Patent Office 3,512,073
Patented May 12, 1970

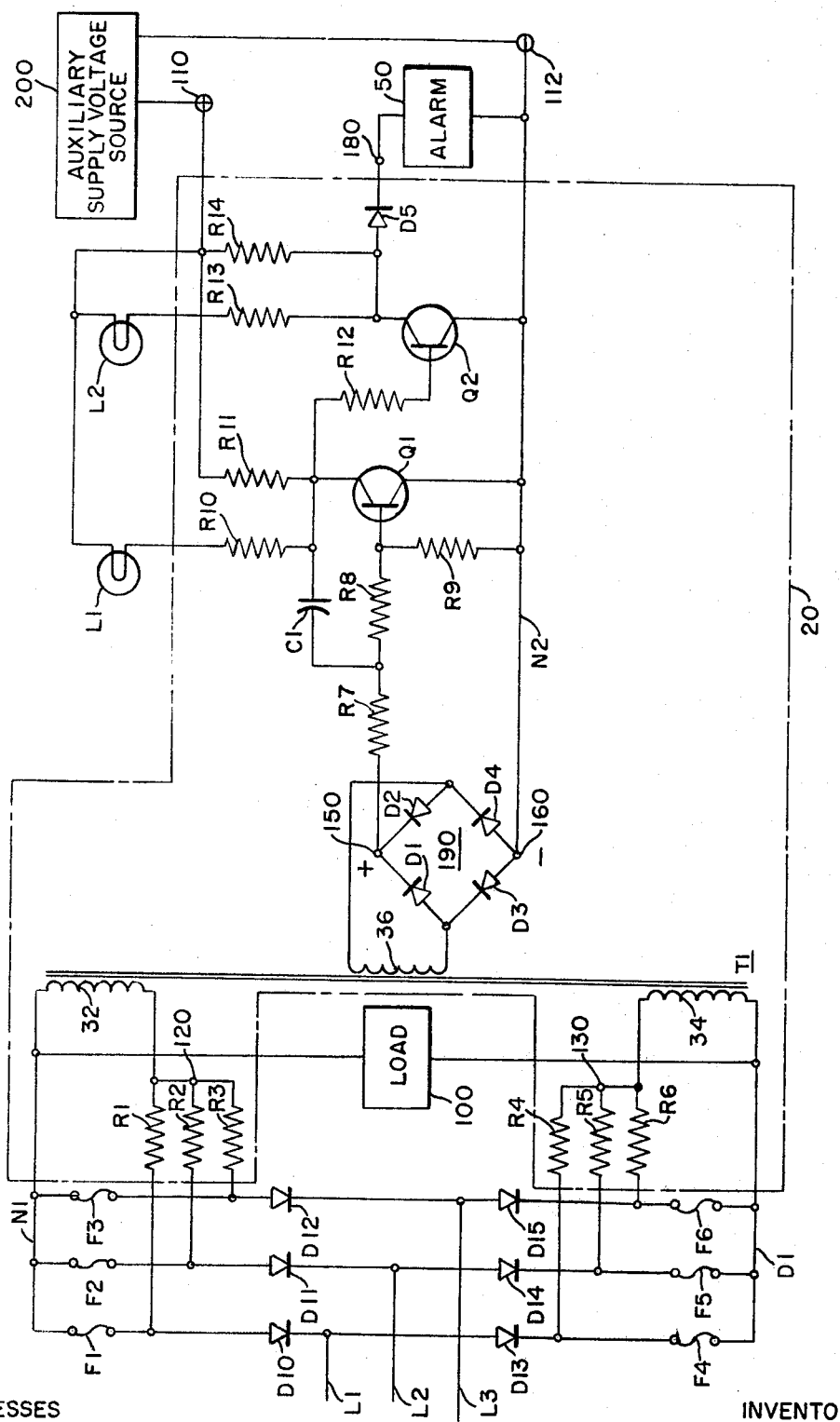

3,512,073
ELECTRICAL CIRCUIT FOR INDICATING THE BLOWING OF FUSES
William H. South, McKeesport, Pa., assignor to Westinghouse Electric Corporation, Pittsburgh, Pa., a corporation of Pennsylvania
Filed Oct. 28, 1968, Ser. No. 771,129
Int. Cl. H02m 1/18; G08b 21/00
U.S. Cl. 321—14                              6 Claims

ABSTRACT OF THE DISCLOSURE

An electrical circuit for indicating the blowing of fuses and, in turn, of diodes connected between the different phases of a polyphase alternating current circuit and a load circuit comprising a transformer connected between the diodes and the associated protective fuses and static switching means for controlling the actuation of indicating means by an auxiliary voltage source.

Background of the invention

This invention relates to electrical circuits for indicating the blowing of fuses and, in turn, the failure of diodes which are protected by fuses.

In certain types of electric power translation systems, such as rectifier systems, various types of means have been employed to indicate the blowing of fuses and, in turn, the failure of diodes or rectifier cells having protective fuses associated therewith, such as disclosed in U.S. Pats. 2,813,243, 3,045,167 and 3,045,168 which are all assigned to the same assignee as the present application and in U.S. Pat. 2,930,961. Such indicating means have certain disadvantages, such as the use of trigger fuses which must be replaced along with the associated main fuses which protect the diodes, or the use of electromechanical relays whose design must be adapted to the voltage of the circuit with which the diodes are employed.

Summary of the invention

In accordance with the invention, a plurality of diodes are connected between the different phases of an alternating current circuit and a load circuit or bus with a protective fuse being connected in series circuit relation with each diode. Current limiting resistors are connected between the junction points of the respective diodes and the associated fuses and a common terminal. The primary winding of a transformer is connected between the common terminal of the associated resistors and one side of the load circuit or bus, while a secondary winding of the transformer is connected in circuit relation with static or semiconductor switching means to actuate at least one associated common indicating means from an associated auxiliary voltage source when one of the diodes fails and the associated protective fuse blows.

It is therefore an object of this invention to provide a new and improved electrical circuit for indicating the blowing of fuses and, in certain applications, the failure of diodes.

Brief description of the drawing

Other objects of the invention will be apparent from the following detailed description taken in conjunction with the accompanying drawing in which the single figure is a simplified schematic diagram illustrating this invention.

Description of the preferred embodiment

Referring now to the drawing, there is illustrated an electric power translation system, more specifically a three-phase, full wave, bridge type rectifier system of the type in which power is taken from a three-phase alternating current circuit or power supply system, including the power leads L1, L2, and L3 and is transmitted through a plurality of rectifier units or diodes to a unidirectional or direct current load circuit having the power leads or load bus conductors N1 and P1. The alternating current power lead L1 is connected to the junction point between the oppositely poled pair of diodes D10 and D13. Similarly, the alternating current power leads L2 and L3 are connected to the junction points between the oppositely poled pairs of diodes D11 and D14 and D12 and D15 respectively. The diodes D10 through D15 may be of the semiconductor type, such as silicon or germanium rectifier units and it will be understood that the diodes D10 through D15 may be of other suitable type.

In order to protect the rectifier system shown in the drawing when one or more of the diodes D10 through D15 fails, such as by shorting out, the protective fuses F1, F2, F3 are connected in series with the diodes D10, D11 and D12, respectively, between the anodes of the associated diodes and the negative output bus conductor N1. Similarly, the protective fuses F4, F5, F6 are connected in series with the diodes D13, D14 and D15, respectively, between the cathodes of the associated diodes and the positive output bus conductor P1. As shown in the drawing, the load 100 which may be representative of any direct current load circuit in a particular application is connected between the negative output bus conductor N1 and the positive output bus conductor P1. It is to be understood that each of the diodes D10 through D15 may represent a plurality of diodes which are electrically connected in parallel in a particular application in order to provide sufficient output current, as required in the rectifier system.

In order to indicate the failure of one or more of the diodes D10 through D15 which will cause the blowing of one or more of the associated protective fuses F1 through F6, respectively, the electrical circuit 20 is connected in circuit relation with the rectifier system which includes the diodes D10 through D15. In general, the electrical circuit 20 is connected to the rectifier system to actuate the operation of a normally deenergized indicating lamp L1 or a normally energized indicating lamp L2 and, where desired, to actuate the operation of an alarm or annunciator 50, which may be remotely located, from an auxiliary supply voltage source 200 when one or more of the diodes D10 through D15 fails and one or more of the associated protective fuse blow.

More specifically, the electrical circuit 20 includes a first group of current limiting resistors R1, R2, and R3 whose left ends, as viewed in the drawing, are connected to the junction points between the diodes D10, D11 and D12 and the associated protective fuses F1, F2 and F3, respectively. The other ends of the current limiting resistors R1, R2 and R3 are connected to a common terminal or indicating bus 120. Similarly, the electrical circuit 20 includes a second group of current limiting resistors R4, R5 and R6 whose left ends, as viewed in the drawing, are connected to the junction points between the diodes D13, D14 and D15 and the associated protective fuses F4, F5 and F6, respectively. The other ends of the current limiting resistors R4, R5 and R6 are connected to a common terminal or indicating bus 130.

In order to provide an alternating output voltage when one of the diodes D10 through D15 fails and one of the associated protective fuses F1 through F6, respectively, blows, the transformer T1 is connected in circuit relation with the current limiting resistors R1 through R6 and the negative and positive output bus conductors N1 and P1, respectively. More specifically, the transformer T1 includes a first primary winding which is connected between the common terminal 120 and the negative output bus conductor N1. It is to be noted that the primary winding 32 forms a series circuit with the current limiting resistor R1 with the series circuit thus formed being electrically connected in parallel with the protective fuse F1. Similarly, the primary winding 32 forms individual series circuits with the current limiting resistors R2 and R3 with the series circuits thus formed being electrically connected in parallel with the protective fuses F2 and F3, respectively. The transformer T1 also includes a second primary winding 35 which is associated with the second group of diodes D13, D14 and D15. In particular, the primary winding 34 is connected between the common terminal 130 to which the current limiting resistors R4, R5 and R6 are connected and the positive output bus conductor P1. Similarly to the primary winding 32, the primary winding 34 forms individual series circuits with the current limiting resistors R4, R5 and R6 with the series circuits thus formed being electrically connected in parallel with the protected fuses F4, F5 and F6, respectively. In order to electrically isolate the balance of the electrical circuit 20 from the rectifier system which includes the diodes D10 through D15, the transformer T1 includes a secondary winding 36 which is electrically insulated from the primary windings 32 and 34 and is disposed on a common magnetic core in inductive relation with the primary windings 32 and 34 to produce an alternating output voltage whenever one or more of the diodes D10 through D15 fails and the associated protective fuse blows.

In order to rectify the alternating output voltage across the secondary winding 36 of the transformer T1 whenever such an output voltage appears, the full wave bridge type rectifier circuit 190 which includes the diodes D1 through D4 is connected to the secondary winding 36. In particular, the input terminals of the rectifier circuit 190 are connected across the secondary winding 36 to provide a unidirectional or direct curent output voltage at the output terminals 150 and 160 of the rectifier circuit 190 whenever an output voltage appears across the secondary winding 36. A common conductor N2 of the electrical circuit 20 is connected to the negative output terminal 160 of the rectifier circuit 190, as shown in the drawing.

In order to control the operation of a normally deenergized indicating means, such as the indicating lamp L1, when one of the diodes D10 through D15 fails and the associated protective fuse blows the electrical circuit 20 includes a first semiconductor or static switching means which comprises the NPN transistor Q1. In order to control the operation of a normally energized indicating means, such as the indicating lamp L2, or to control the operation of an alarm or annunciator 50 from an auxiliary supply voltage source 200, the electrical circuit 20 also includes a second semiconductor or static switching means which comprises the NPN transistor Q2.

In order to apply a portion of the output voltage across the output terminals 150 and 160 of the rectifier circuit 190 to the input of the transistor Q1 whenever an output voltage appears across the secondary winding 36, the resistors R7, R8 and R9 are connected in series with one another across the output terminals 150 and 160 with the base-emitter circuit of the transistor Q1 being electrically connected in parallel with the resistor R9. The resistor R9 is connected between the base and the emitter of the transistor Q1 to prevent the operation of the transistor Q1 due to leakage current and to establish the minimum base-emitter current necessary to actuate the transistor Q1 to a saturated condition. The collector of the transistor Q1 is connected to the positive terminal 110 of the auxiliary supply voltage source 200 through the series circuit which includes a current limiting resistor R10 and a normally indicating lamp L1. Where a normally deenergized indicating lamp L1 is not provided, the collector of the transistor Q1 may be connected to the positive terminal 110 of the auxiliary supply voltage source 200 through the collector load resistor R11. In order to prevent any cyclic operation of the transistor Q1 and the associated indicating means, as will be described more fully hereinafter, a filter capacitor C1 is connected between the collector of the transistor Q1 and the junction point between the resistors R7 and R8. The capacitor C1 removes any pulsations in the output voltage of the rectifier circuit 190 which might otherwise be applied to the input of the transistor Q1 and assists in making the change which occurs in the operating condition of the transistor Q1 occur more rapidly in response to the failure of one or more of the diodes D10 through D15 and the blowing of one or more of the associated protective fuses. It is to be noted that the emitter of the transistor Q1 and the lower end of the resistor R9 are both connected to the common conductor N2 of the electrical circuit 20.

The collector of the transistor Q1 is coupled to the base of transistor Q2 through the resistor R12, while the emitter of the transistor Q2 is connected to the common conductor N2. The resistor R12 assists in reducing the current through the indicating lamp L1 during the operating condition of the electrical circuit 20 when the indicating lamp L1 is normaly deenergized. The collector of the transducer Q2 is connected to the positive terminal 110 of the auxilary supply voltage source 200 through a series circuit which includes the current limiting resistor R13 and the normally energized indicating means, which comprises the indicating lamp L2, as illustrated in the drawing. In the event that a normally energized indicating means, such as the indicating lamp L2, is not provided in a particular application, the collector of the transistor Q2 is connected to the positive terminal 110 of the auxiliary supply voltage source 200 through the collector load resistor R14. In order to permit the actuation or energization of the alarm or annunciator 50 which may be located at a point which is remote from the electrical circuit 20 from the auxiliary supply voltage source 200, the collector of the transistor Q2 is connected to the terminal 180 at the upper end of the alarm 50 through the isolating diode D5. The isolating diode D5 is provided to electrically or operatively isolate the alarm circuit 50 which may be common to a plurality of electrical indicating circuits similar to the electrical indicating circuit 20 from the individual indicating circuits and to prevent feedback from the alarm circuit 50 into the individual electrical indicating circuit, such as the electrical circuit 20. It is to be noted that the negative terminal of the auxiliary supply voltage source 200 at the terminal 112 is connected to the common conductor N2 of the electrical indicating circuit 20.

Considering the operation of the electrical circuit 20, prior to the failure of one of the diodes D10 through D15 and the blowing of the associated protective fuse, the primary windings 32 and 34 of the transformer T1 are operatively shorted out by the protective fuses F1 through F3 and F4 through F6, respectively. During such a normal operating condition, the output voltage across the secondary winding of the transformer T1 which is applied across the input terminals of the rectifier circuit 190 is substantially negligible. In the normal operating condition of the electrical circuit 20, as long as the output voltage across the secondary winding 36 of the transformer T1 is substantially negligible as just described, the base drive current applied to the base emitter circuit of the transistor Q1 will also be substantially negligible and the transistor Q1 will remain in a substantially non-conducting or cutoff condition. As long as the transistor Q1 remains substantially non-conducting or cutoff, the current flow through the collector-emitter circuit of the transistor Q1 will be substantially negligible and the indicating lamp L1 will be substantially deenergized, since the current through the indicating lamp L1 from the positive terminal 110 of the auxiliary supply voltage source 200 will be reduced or limited by the resistors R10 and R12 to a very low level.

In addition, as long as the transistor Q1 remains substantially non-conducting or cutoff, the voltage drop across the resistor R11, where it is provided, due to the collector-emitter current of the transistor Q1 will also be substantially negligible.

In the normal operating condition of the electrical circuit 20, the second switching means or transistor Q2 will be actuated to a substantially saturated condition by the base drive current which flows through one of two alternative paths from the positive terminal 110 of the auxiliary supply voltage source 200 through the series circuit which is provided, the base drive current for the transistor Q2 will flow from the positive terminal 110 of the auxiliary supply voltage source 200 through the series circuit which includes the indicating lamp L1, the resistor R10, the resistor R12, the base-emitter circuit of the transistor Q2, the common conductor N2 to the negative terminal 112 of the auxiliary supply voltage source 200. Alternatively, the base drive current of the transistor Q2 will flow from the positive terminal 110 through the resistor R11, the resistor R12, the base-emitter circuit of the transistor Q2 and the common conductor N2 to the negative terminal 112 of the auxiliary supply voltage source 200 where the normally deenergized indicating lamp L1 is not provided. As long as the transistor Q2 remains in a saturated condition, the normally energized indicating lamp L2, where provided, will be energized by the current which flows from the positive terminal 110 of the auxiliary supply voltage source 200 through the indicating lamp L2, the resistor R13, the collector-emitter path of the transistor Q2, the common conductor N2 to the negative terminal 112 of the auxiliary supply voltage source 200. Where the normally energized indicating lamp L2 is not provided, the collector-emitter current of the transistor Q2 will flow from the positive terminal 110 through the resistor R14 and the collector-emitter path of the transistor Q2 through the common conductor N2 to the negative terminal 112 of the auxiliary supply voltage source 200.

In the normal operating condition of the electrical circuit 20, as long as the transistor Q2 remains in a substantially saturated condition, the voltage drop across the collector-emitter circuit of the transistor Q2 will be relatively negligible and the voltage or potential at the collector of the transistor Q2 and, in turn, at the terminal 180 at the upper end of the alarm or annunciator 50 will be very close to the potential at the common conductor N2. The voltage at the terminal 180 will therefore be insufficient to actuate the operation of the alarm or annunciator 50 since the lower end of the alarm or annunciator circuit 50 is connected to the common conductor N2. In other words, as long as the transistor Q2 remains in the substantially saturated condition, the voltage or the potential at the collector of the transistor Q2 and, in turn, at the terminal 180 at the upper end of the alarm annunciator 50 will be held at a value relatively close to the potential at the common conductor N2 and the auxiliary supply voltage source 200 will not be permitted to energize the alarm or annunciator circuit 50.

When one of the diodes D10 through D12 fails and one of the associated protective fuses F1 through F3, respectively, blows, an alternating current voltage which may have an additional unidirectional component will appear across one of the fuses F1 through F3. The alternating current voltage across the blown fuse will be applied through one of the current limiting resistors R1 through R3 to the first primary winding 32 of the transformer T1 and an alternating output voltage will therefore appear across the secondary winding 36 of the transformer T1. Similarly, if one of the diodes D13, D14 or D15 fails and one of the associated protective fuses F4, F5 or F6 blows due to the increased current which results through the associated protective fuse, an alternating current voltage which may include an additional unidirectional component will appear across the blown fuse and be applied to the other primary winding 34 of the transformer T1 through one of the current limiting resistors R4, R5 or R6. When an alternating voltage is applied to either the first primay winding 32 or to the second primary winding 34 of the transformer T1, an alternating voltage will also appear across the secondary winding 36 of the transformer T1. In other words, if at least one of the diodes D10 through D15 fails and at least one of the asociated protective fuses F1 through F6, respectively, blows, an alternating output voltage will appear across the secondary winding of the transformer T1. It is to be noted that only a portion of the alternating voltage which appears across one of the blown fuses F1 through F6 will be applied to one of the primary windings 32 or 34 due to the voltage drop across the particular current limiting resistor associated with the blown fuse.

When an alternating voltage appears across the secondary winding 36 of the transformer T1 in response to the failure of one of the diodes D10 through D15 and the blowing of the associated protective fuse, a unidirectional output voltage will appear across the output terminals 150 and 160 of the rectifier circuit 190. When a unidirectional output voltage appears across the terminals 150 and 160, a base drive current will flow from the positive terminal 150 of the rectifier circuit 190 through the resistors R7 and R8 and through the base-emitter circuit of the transistor Q1 to actuate the transistor Q1 from a substantially non-conducting or cutoff condition to a substantially saturated condition. When the transistor Q1 is actuated to a substantially saturated condition, the voltage drop across the collector-emitter circuit of the transistor Q1 will drop to a relatively negligible value and increased current flow will result from the positive terminal 110 of the auxiliary supply voltage source 200 through the series circuit which includes the normally deenergized lamp L1, the resistor R10 and the collector-circuit of the transistor Q1 to the negative terminal 112 of the auxiliary supply voltage source 200 through the common conductor N2 to thereby energize the indicating lamp L1. Where the normally deenergized indicating lamp L1 is not provided, the increased current flow through the collector-emitter path of the transistor Q1 will flow from the positive terminal 110 of the auxiliary supply voltage source 200 through the resistor R11, the collector-emitter circuit of the transistor Q1 and the common conductor N2 to the negative terminal of the auxiliary supply voltage source 200.

When the transistor Q1 is actuated to a substantially saturated condition, the base drive current for the transistor Q2 which previously flowed through the resistor R12 and the base-emitter circuit of the transistor Q2 will be diverted to the current path which extends from the collector of the transistor Q1 through the collector-emitter circuit of the transistor Q1 and the common conductor N2 to the negative terminal 112 of the auxiliary supply voltage source 200 and the transistor Q2 will be actuated from a substantially saturated condition to a substantially non-conducting or cutoff condition. When the transistor Q2 is actuated to a substantially non-conducting condition, the current flow from the positive terminal 110 of the auxiliary supply voltage source 200 through the normally energized indicating lamp L2, where provided, and the resistor R13 will be reduced to a negligible value and the normally energized indicating lamp L2 will be actuated to a substantially deenergized operating condition. Where the normally energized indicating lamp L2 is not provided, the current flow which would normally flow from the positive terminal 110 of the auxiliary supply voltage source 200 through the resistor R14 and the collector-emitter circuit of the transistor Q2 to the negative terminal 112 of the auxiliary supply voltage source 200 through the common conductor N2 will be diverted through the isolating diode D5 to the terminal 180 of the alarm or annunciator 50 to the negative terminal 112 of the auxiliary supply voltage source 200 to thereby actuate the alarm or annunciator circuit 50 to a different operating condition.

When the transistor Q2 is actuated to substantially nonconducting condition, the current flow through the collector-emitter circuit of the transistor Q2 will be reduced to a substantially negligible value and the current which would otherwise flow from the positive terminal 110 of the auxiliary supply voltage source 200 through either the current path which includes the normally energized indicating lamp L2 and the resistor R13 or the collector load resistor L14 will also be reduced to a negligible value. When the current through the path which includes the indicating lamp L2 and the resistor R13 or the current through the path which includes the resistor R14 is reduced to a negligible value, the voltage drop across either of said current paths will also decrease to a relatively low value and the voltage at the collector of the transistor Q2 will be relatively close to the voltage at the positive terminal 110 of the auxiliary supply voltage source 200. When the voltage or potential at the collector of the transistor Q2 increases to a value which is relatively close to the voltage at the positive terminal 110 of the auxiliary supply voltage 200, current will flow from the anode of the isolating diode D5 into the terminal 180 at the upper end of the alarm or annunciator circuit 50 and through the alarm or annunciator circuit 50 to the negative terminal 112 of the auxiliary supply voltage 200 to thereby actuate the alarm or annunciator circuit 50 to a different operating condition.

It is important to note that the electrical circuit 20 responds to the failure of one or more of the diodes D10 through D15 and the blowing of the associated protective fuses F1 through F6, respectively, to change the operating condition of a normally energized local indicating lamp or relay, such as the indicating lamp L1, or to change the operating condition of a local normally energized indicating lamp or relay, such as the indicating lamp L2, and to provide an output through the isolating diode D5 which may be used to actuate a change in the operating condition of an alarm or annunciator circuit 50 which may be located remotely from the electrical indicating circuit 20. As previously mentioned, either a normally deenergized indicating device, such as the indicating lamp L1, or a normally energized indicating device, such as the indicating lamp L2, would be provided in a particular application. In addition, as previously noted, the alarm or annunciator circuit 50 may be a common alarm or annunciator circuit which responds to a plurality of electrical indicating circuits similar to the indicating circuit 20.

It is to be understood that in certain applications that additional transformers similar to the transformer T1 may be provided to respond to the blowing of additional fuses and, in turn, to the failure of additional groups of diodes with the secondary windings of a plurality of such transformers being electrically connected in parallel to a common electrical indicating circuit, such as the indicating circuit 20. Alternatively, the transformer T1 might be provided with additional primary windings which would respond to additional groups of fuses and associated groups of diodes similar to the groups of diodes D10 through D12 and D13 and D15.

It is also to be understood that in a particular application the values of the current limiting resistors R1 through R6 may be selected to adjust the portion of the alternating voltage which results when one of the fuses F1 through F6 blows which is applied to one of the primary windings 32 or 34 of the associated transformer T1. Finally, it is to be understood that where the diodes D10 through D15 are to be mounted in a rotating environment, such as in the excitation system of a brushless exciter which is employed with an associated generator, the primary windings 32 and 34 may be arranged to rotate with the associated diodes D10 through D15 and the protective fuses F1 through F6 the secondary winding 36 may be arranged to be relatively stationary to provide the necessary output voltage to the balance of the electrical indicating circuit 20.

Finally, it is to be understood that the teachings of the invention may be employed to indicate the blowing of fuses connected in a plurality of phases of an alternating current system to protect load circuits other than diodes.

The apparatus embodying the teachings of this invention has several advantages. For example, a common indicating circuit is provided which will provide a common indication for a relatively large plurality of fuses and, in turn, diodes in a particular application. In addition, the transformer T1 may be selected to provide a relatively low output voltage as required for the balance of the electrical indicating circuit 20 with only the rating of the transformer T1 being changed to adapt the electrical indicating circuit 20 to a particular operating voltage in the associated rectifier system in which the failure of the diodes is to be indicated or monitored. A further advantage of the invention, as disclosed, is that the electrical indicating circuit 20 is readily adapted to cooperate with additional similar indicating circuits to actuate a common alarm or annunciator circuit which is connected to the outputs of a plurality of indicating circuits similar to the electrical indicating circuit 20.

Since numerous changes may be made in the above-described apparatus and different embodiments of the invention may be made without departing from the spirit and scope thereof, it is intended that all the matter contained in the foregoing description or shown in the accompanying drawings shall be interpreted as illustrative and not in a limiting sense.

I claim:

1. An indicating circuit for a plurality of fuses connected between the different phases of a polyphase alternating current circuit and a load bus comprising a plurality of fuses, each fuse being connected in series with at least one associated diode between the associated diode and one side of said load bus, a plurality of current limiting resistors, each current limiting resistor having one end conected to the junction point between an associated fuse and diode, the other ends of said current limiting resistors being all connected to a common terminal, a transformer having a primary winding connected between said common terminal and said one side of said load bus and a secondary winding, rectifier means connected to said secondary winding and having output terminals, semiconductor switching means having two operating conditions connected to said rectifier means to be actuated by an output at said output terminals when at least one of said fuses blows between one operating condition and the other operating condition of said switching means, a common indicating means having two operating conditions connected to said switching means to be actuated between operating conditions when said switching means is actuated between operating conditions and an auxiliary power source connected to said indicating means to provide the power for said indicating means in at least one operating condition.

2. The combination as claimed in claim 1 wherein said indicating means is normally deenergized until at least one of said fuses blows.

3. The combination as claimed in claim 1 wherein said indicating means is normally energized until at least one of said fuses blows.

4. A failure indicating circuit for first and second groups of diodes connected between the different phases of a polyphase alternating current circuit and the first and second sides, respectively, of a load bus with a protective fuse connected in series with each diode between the associated diode and the adjacent side of said load bus comprising a plurality of current limiting resistors, each resistor having one end connected to the junction point between an associated fuse and diode, the other ends of the resistors connected to said first group of diodes being connected to a first common terminal and the other ends of the resistors connected to said second group of diodes being connected to a second common terminal, a transformer having a first primary winding connected between said first common terminal and said first side of said load bus, a second primary winding connected between said second common terminal and said second side of said load bus, and a secondary winding, rectifier means connected to said secondary winding and having output terminals, static switching means having two operating conditions connected to said rectifier means to be actuated between operating conditions by an output at said output terminals when at least one of said fuses blows, a common indicating means having two operating conditions connected to said switching means to be actuated between operating conditions when said switching means is actuated between operating conditions and an auxiliary power source connected to said indicating means to provide power for said indicating means in at least one operating condition.

5. The combination as claimed in claim 4 wherein said indicating means is normally deenergized until at least one of said fuses blows.

6. The combination as claimed in claim 4 wherein said indicating means is normally energized until at least one of said fuses blows.

References Cited

UNITED STATES PATENTS

| | | | |
|---|---|---|---|
| 2,813,243 | 11/1957 | Christian et al. | 321—12 |
| 2,882,521 | 4/1959 | Salzer et al. | 340—250 |
| 2,930,961 | 3/1960 | Lezan | 321—14 |
| 3,031,653 | 4/1962 | Bowar et al. | 340—250 |
| 3,045,167 | 7/1962 | Colaiaco | 321—14 |
| 3,045,168 | 7/1962 | Fellendorf | 321—14 |
| 3,045,224 | 7/1962 | Colaiaco | 321—14 XR |
| 3,047,848 | 7/1962 | Johnson | 340—250 |

WILLIAM M. SHOOP, Jr., Primary Examiner

U.S. Cl. X.R.

340—250